United States Patent
Kwon et al.

(10) Patent No.: US 10,693,532 B2
(45) Date of Patent: Jun. 23, 2020

(54) OPERATION METHOD OF STATION IN WIRELESS LOCAL AREA NETWORK

(71) Applicant: NEWRACOM, INC., Irvine, CA (US)

(72) Inventors: Hyoungjin Kwon, Daejeon (KR); Jeehoon Kim, Daejeon (KR); Minho Cheong, Irvine, CA (US)

(73) Assignee: NEWRACOM, INC., Lake Forest, CA (US)

(*) Notice: Subject to any disclaimer, the term of this patent is extended or adjusted under 35 U.S.C. 154(b) by 200 days.

(21) Appl. No.: 14/843,956

(22) Filed: Sep. 2, 2015

(65) Prior Publication Data
US 2016/0066338 A1 Mar. 3, 2016

Related U.S. Application Data

(60) Provisional application No. 62/045,446, filed on Sep. 3, 2014.

(30) Foreign Application Priority Data

Sep. 2, 2015 (KR) .................. 10-2015-0124136

(51) Int. Cl.
| | |
|---|---|
| H04L 5/00 | (2006.01) |
| H04W 72/12 | (2009.01) |
| H04W 72/04 | (2009.01) |
| H04B 7/04 | (2017.01) |
| H04B 7/0452 | (2017.01) |
| H04B 7/0413 | (2017.01) |

(52) U.S. Cl.
CPC .......... *H04B 7/0452* (2013.01); *H04L 5/0007* (2013.01); *H04L 5/0023* (2013.01); *H04L 5/0041* (2013.01); *H04L 5/0048* (2013.01); *H04L 5/0091* (2013.01); *H04W 72/1278* (2013.01); *H04B 7/0413* (2013.01); *H04L 5/0087* (2013.01)

(58) Field of Classification Search
None
See application file for complete search history.

(56) References Cited

U.S. PATENT DOCUMENTS

| | | | | |
|---|---|---|---|---|
| 9,924,512 | B1* | 3/2018 | Zhang | H04W 72/0453 |
| 2009/0310692 | A1* | 12/2009 | Kafle | H04L 5/0007 375/260 |
| 2010/0329366 | A1* | 12/2010 | Wang | H04L 5/0023 375/259 |
| 2011/0194644 | A1* | 8/2011 | Liu | H04L 5/0023 375/295 |
| 2012/0327914 | A1* | 12/2012 | Kang | H04L 5/0023 370/336 |
| 2013/0329680 | A1* | 12/2013 | Lee | H04B 7/0452 370/329 |

(Continued)

Primary Examiner — Jason E Mattis
Assistant Examiner — Hong Shao

(57) ABSTRACT

An operation method of a station in a wireless local area network (WLAN) is disclosed. An operation method of a first station comprises generating a high efficiency (HE) preamble including scheduling information of a plurality of reception stations; and generating a physical layer convergence procedure (PLCP) protocol data unit (PPDU) including a legacy preamble, the HE preamble, and a payload having data units to be transmitted to the plurality of reception stations. Therefore, a performance of WLAN may be enhanced.

20 Claims, 8 Drawing Sheets

(56) References Cited

U.S. PATENT DOCUMENTS

| | | | | |
|---|---|---|---|---|
| 2014/0029681 A1* | 1/2014 | Zhang | H04L 1/0046 | 375/260 |
| 2014/0307612 A1* | 10/2014 | Vermani | H04L 5/0044 | 370/312 |
| 2014/0307650 A1* | 10/2014 | Vermani | H04L 5/0044 | 370/329 |
| 2014/0369276 A1* | 12/2014 | Porat | H04L 5/003 | 370/329 |
| 2015/0009894 A1* | 1/2015 | Vermani | H04L 1/0072 | 370/328 |
| 2015/0023335 A1* | 1/2015 | Vermani | H04B 7/0452 | 370/338 |
| 2015/0063370 A1* | 3/2015 | Rouhana | H04L 47/15 | 370/432 |
| 2015/0139089 A1* | 5/2015 | Azizi | H04W 4/008 | 370/329 |
| 2015/0146653 A1* | 5/2015 | Zhang | H04L 5/0041 | 370/329 |
| 2016/0050093 A1* | 2/2016 | Choi | H04L 27/2602 | 375/308 |
| 2016/0088665 A1* | 3/2016 | Kim | H04W 76/021 | 370/329 |
| 2016/0337153 A1* | 11/2016 | Seok | H04L 27/2602 | |

* cited by examiner

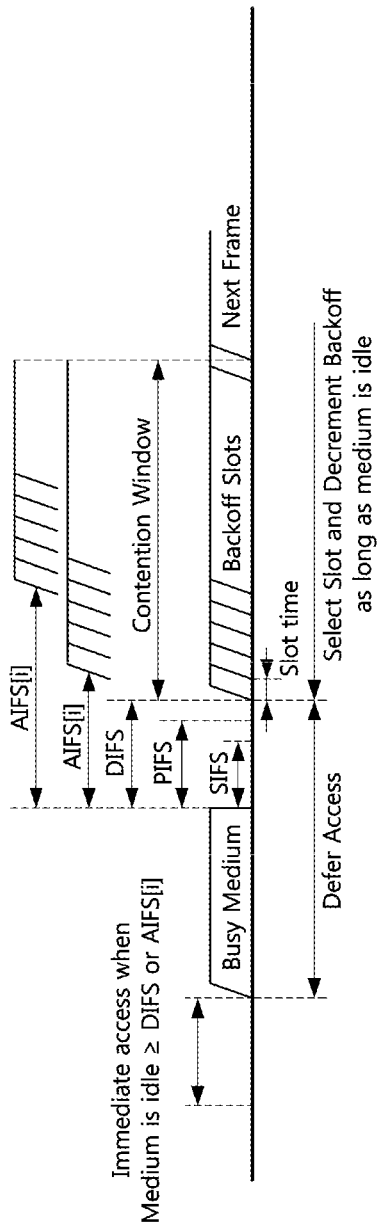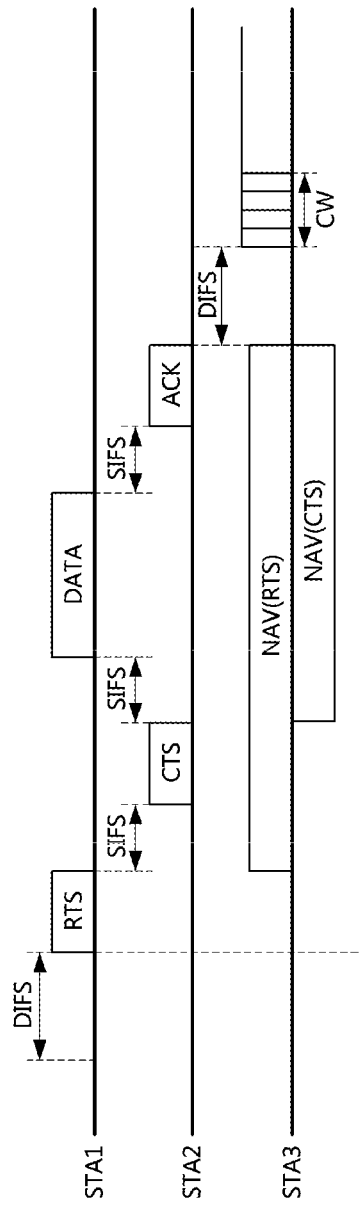

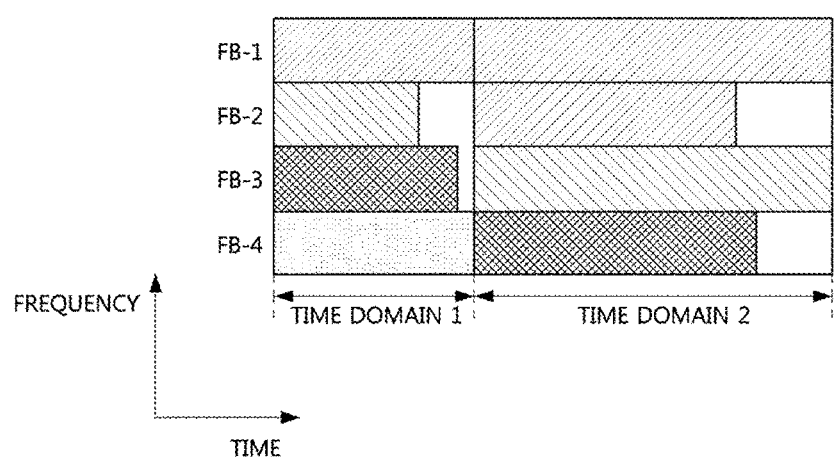

OPERATION METHOD OF STATION IN WIRELESS LOCAL AREA NETWORK

CROSS-REFERENCE TO RELATED APPLICATIONS

This application claims priority to U.S. Patent Application No. 62/045,446, filed on Sep. 3, 2014, and Korean Patent Application No. 10-2015-0124136 filed on Sep. 2, 2015, the entire contents of which are hereby incorporated by reference.

BACKGROUND

1. Technical Field

The present disclosure relates to a wireless local area network (WLAN) technology, and more particularly to a technology for multi-user transmission and reception in the WLAN.

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies are created and standardized by the IEEE 802.11 Working Group under IEEE 802 Standard Committee. As such WLAN technology becomes more prevalent and its applications become more diverse, there is increasing demand for new WLAN technology that can support a higher throughput than existing WLAN technologies. Very high throughput (VHT) WLAN technology is proposed to support a data rate of 1 Gbps and higher. A WLAN technology according to IEEE 802.11ac standard is a technology providing VHT in sub 6 GHz band, and A WLAN technology according to IEEE 802.11ad standard is a technology providing VHT in 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11ah standard is a technology which has been developed for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11ax standard is being developed for enhancing frequency efficiency of dense environments in which numerous access points and stations exist.

In the system based on such the WLAN technologies, in a case that data units for multiple users are transmitted through a physical layer convergence procedure (PLCP) protocol data unit (PPDU), methods for informing which users receive the data units and which resources are used for transmitting the data units are needed.

SUMMARY

Accordingly, exemplary embodiments of the present disclosure are provided to substantially obviate one or more problems due to limitations and disadvantages of the related art. Exemplary embodiments of the present disclosure provide scheduling methods and apparatuses for multi-user transmission.

In order to achieve the objectives of the present disclosure, an operation method performed in a first station according to an exemplary embodiment, the method may comprise: generating a high efficiency (HE) preamble including scheduling information of a plurality of reception stations; and generating a physical layer convergence procedure (PLCP) protocol data unit (PPDU) including a legacy preamble, the HE preamble, and a payload having data units to be transmitted to the plurality of reception stations.

Here, the HE preamble further includes information indicating a transmission manner of the PPDU.

Here, the PPDU is transmitted based on at least one of a multi user-multiple input multiple output (MU-MIMO) and an orthogonal frequency division multiple access (OFDMA).

Here, the scheduling information is included in a HE signal (HE-SIG) field of the HE preamble.

Here, the scheduling information includes resource allocation information indicating a resource allocated to the plurality of reception stations and identification information for each of the plurality of reception stations.

Here, the scheduling information further includes identification information of a sub-group to which the plurality of reception stations belong.

Here, the resource allocation information is an allocation pattern of spatial streams or an allocation pattern of frequency bands.

Here, the HE preamble further includes scheduling information of a plurality of groups to which the plurality of reception stations respectively belong.

Here, the scheduling information includes resource allocation information indicating a resource allocated to the plurality of groups and identification information for each of the plurality of groups.

Here, when the payload included in the PPDU is divided into a plurality of time domains and at least one time domain among the plurality of time domains has a different allocation pattern of frequency bands, the HE preamble includes scheduling information for each of the plurality of time domains.

Here, when the payload included in the PPDU is divided into a plurality of time domains, the HE preamble further includes information indicating that the payload is divided into the plurality of time domains.

Here, when the payload included in the PPDU is divided into a plurality of time domains, the HE preamble further includes information indicating lengths of data units included in each of the plurality of time domains.

Here, when the PPDU includes data units belonging to different access categories, the HE preamble further includes information indicating that the PPDU includes data units belonging to different access categories.

Here, when the PPDU includes data units belonging to different access categories, the HE preamble further includes traffic identifiers (TIDs) for access categories to which the data units respectively belong.

Here, the PPDU includes data units belonging to different access categories and information indicating an end of data units belonging to a first access category, and the information indicating the end of data units is located between data units belonging to the different access categories.

In order to achieve the objectives of the present disclosure, an operation method performed in a first station according to another exemplary embodiment, the method may comprise: obtaining a legacy preamble of a physical layer convergence procedure (PLCP) protocol data unit (PPDU); obtaining a high efficiency (HE) preamble of the PPDU; and obtaining at least one data unit included in a payload of the PPDU through a resource indicated by scheduling information for a plurality of reception stations included in the HE preamble.

Here, the HE preamble further includes information indicating a transmission manner of the PPDU.

Here, the scheduling information includes resource allocation information indicating a resource allocated to the plurality of reception stations and identification information for each of the plurality of reception stations.

Here, the scheduling information further includes identification information of a sub-group to which the plurality of reception stations belong.

Here, the resource allocation information is an allocation pattern of spatial streams or an allocation pattern of frequency bands.

Here, when the payload included in the PPDU is divided into a plurality of time domains and at least one time domain among the plurality of time domains has a different allocation pattern of frequency bands, the HE preamble includes scheduling information for each of the plurality of time domains.

Here, when the payload included in the PPDU is divided into a plurality of time domains, the HE preamble further includes information indicating lengths of data units included in each of the plurality of time domains.

According to exemplary embodiments of the present disclosure, scheduling methods for multi-user transmission (e.g., orthogonal frequency division multiple access (OFDMA), multi user-multiple input multiple output (MU-MIMO), etc.) may be provided. According to the scheduling methods for multi-user transmission, each of spatial streams may be used for transmitting data units of different users, and each of frequency bands included in a single spatial stream may be used for transmitting data units of different users. Also, respective data units of multiple users may be multiplexed and transmitted in a time domain of a single frequency band.

Also, according to the scheduling methods for multi-user transmission, space, frequency, and time resources can be efficiently utilized. Also, the scheduling methods can be performed with minimum scheduling information exchanges. Thus, the performance of WLAN can be enhanced, and Quality of Service (QoS) and Quality of Experience (QoE) for users may also be enhanced.

Also, an aggregate-MPDU (A-MPDU) including a plurality of medium access control (MAC) protocol data units (MPDUs) belonging to different access categories (e.g., AC_VO, AC_VI, AC_BE, and AC_BK) may be generated, and an A-MPDU including MPDUs having different frame formats (e.g., data frame, management frame, and control frame) may also be generated. Therefore, since an A-MPDU can be formed in various ways, the performance of WLAN systems may be enhanced.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 4 illustrates interframe space (IFS) relationships;

FIG. 5 is a timing diagram illustrating a frame transmission procedure based on a CSMA (carrier sense multiple access)/CA (collision avoidance) manner for avoiding collision between frames in a channel;

FIG. 9 is a conceptual diagram illustrating an exemplary embodiment of an allocation pattern of spatial streams;

FIG. 10 is a conceptual diagram illustrating an exemplary embodiment of an allocation pattern of frequency bands;

FIG. 11 is a block diagram illustrating an exemplary embodiment of a payload included in a PPDU.

DETAILED DESCRIPTION

Figure 1:
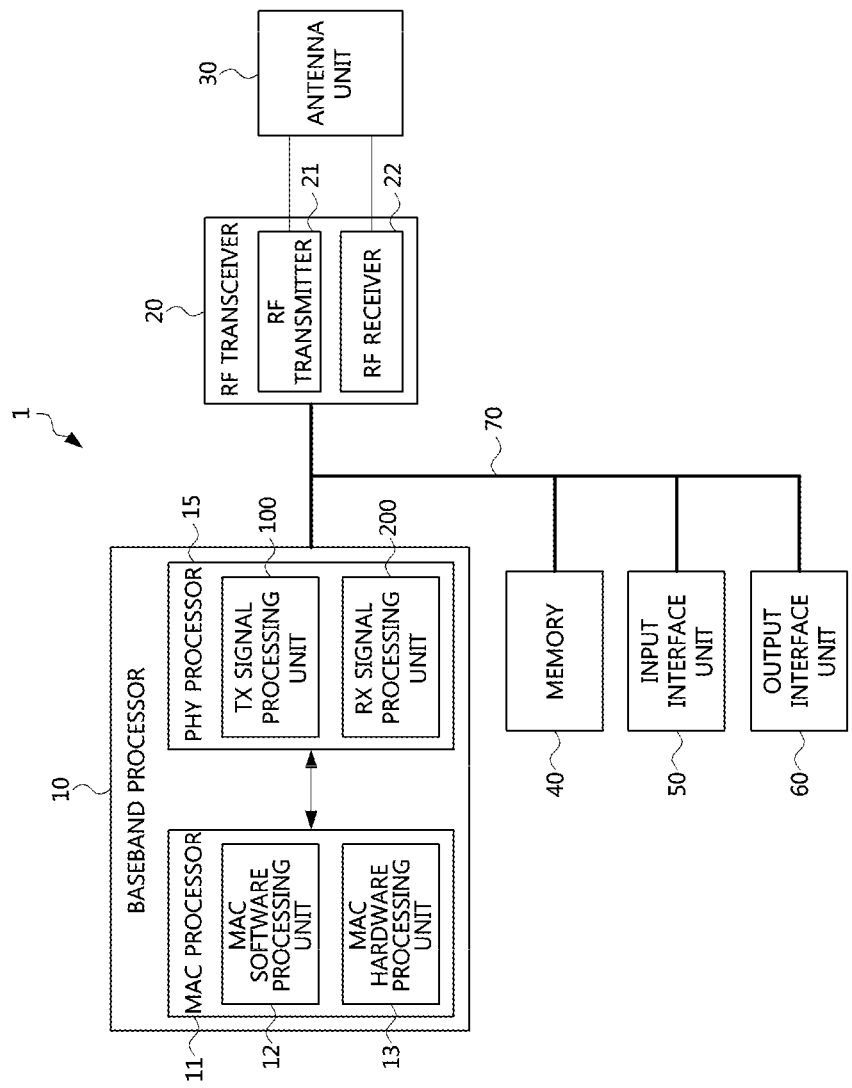
FIG. 1 is a block diagram illustrating a structure of a WLAN device according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all of the plurality of WLAN devices may be non-AP STAs in Ad-hoc networking. In general, the AP STA and the non-AP STAs may be collectively called the STA. However, for ease of description herein, only the non-AP STAs are referred to as the STAs.

FIG. 1 is a block diagram illustrating a structure of a WLAN device according to an embodiment.

Referring to FIG. 1, the WLAN device 1 may include a baseband processor 10, a radio frequency (RF) transceiver 20, an antenna unit 30, a memory 40, an input interface unit 50, an output interface unit 60, and a bus 70. The baseband processor 10 may perform baseband signal processing, and may include a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, embodiments of the MAC processor 11 are not limited to this. The PHY processor 15 may include a transmitting (Tx) signal processing unit 100 and a receiving (Rx) signal processing unit 200.

The baseband processor 10, the memory 40, the input interface unit 50, and the output interface unit 60 may communicate with each other via the bus 70. The RF transceiver 20 may include an RF transmitter 21 and an RF receiver 22. The memory may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
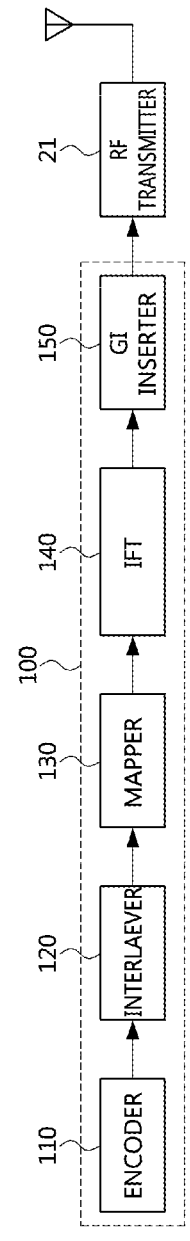
FIG. 2 is a schematic block diagram illustrating a transmitting signal processing unit 100 according to an embodiment suitable for use in a WLAN.

FIG. 2 is a schematic block diagram illustrating a transmitting signal processing unit 100 according to an embodiment suitable for use in a WLAN.

Referring to FIG. 2, a transmitting signal processing unit 100 may include an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams Nss. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper. When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
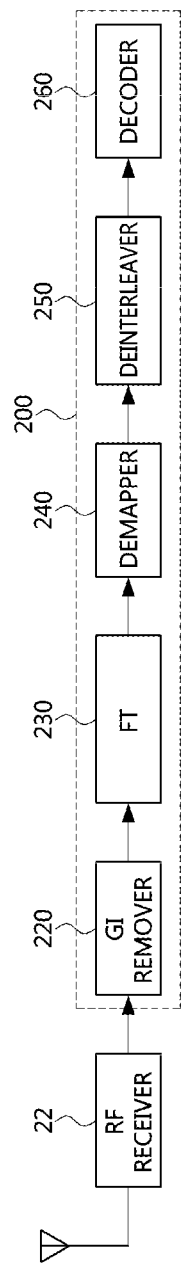
FIG. 3 is a schematic block diagram of a receiving signal processing unit according to an embodiment suitable for use in the WLAN.

FIG. 3 is a schematic block diagram of a receiving signal processing unit according to an embodiment suitable for use in the WLAN.

Referring to FIG. 3, a receiving signal processing unit 200 may include a GI remover 220, a Fourier transformer (FT) 230, a demapper 240, a deinterleaver 250, and a decoder 260. An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain. When the MIMO or the MU-MIMO is used, the receiving signal processing unit 200 may include a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

FIG. 4 illustrates interframe space (IFS) relationships.

Referring to FIG. 4, a data frame, a control frame, or a management frame may be exchanged between WLAN devices. The data frame is used for transmission of data forwarded to a higher layer. The WLAN device transmits the data frame after performing backoff if a distributed coordination function IFS (DIFS) has elapsed from a time when the medium has been idle.

The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of the previous frame, the WLAN device transmits the control frame without performing backoff when a short IFS (SIFS) has elapsed. The type and subtype of frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC] has elapsed. In this case, the data frame, the management frame, or the control frame which is not the response frame may use the AIFS[AC].

FIG. 5 is a timing drawing illustrating a frame transmission procedure based on a CSMA (carrier sense multiple access)/CA (collision avoidance) manner for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device STA3.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the CTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after a SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff operation.

Meanwhile, multi-user transmission, such as orthogonal frequency division multiple access (OFDMA), MU-MIMO, and so on, may be performed in the WLAN. In the below description, methods for multi-user transmission in the WLAN will be explained.

Figure 6:
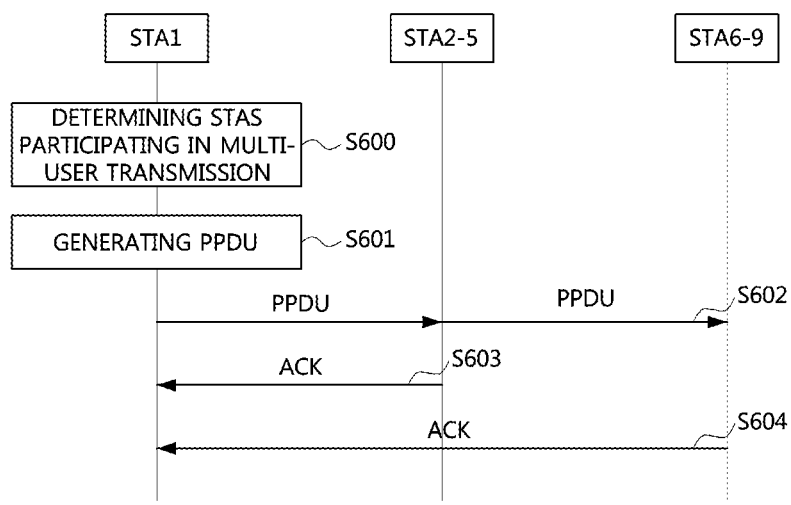
FIG. 6 is a flow chart illustrating a method of multi-user transmission according to an exemplary embodiment.

FIG. 6 is a flow chart illustrating a method of multi-user transmission according to an exemplary embodiment.

Referring to FIG. 6, stations STA1 to STA9 may establish a BSS. Here, the STA1 may be an AP, and each of the STA2 to STA9 may be a non-AP STA. The STA1 may determine stations which will participate in multi-user transmission (S600). For example, the STA1 may transmit a first frame including an indicator requesting identification information (e.g., MAC address, association identifier (AID), partial AID (PAID), etc.) of the stations participating in multi-user transmission in a broadcast manner or a unicast manner. The STA1 may receive second frames including identification information of the STA2 to STA9 as responses corresponding to the first frame. In this case, the STA1 may determine the STA2 to STA9 which transmitted the second frames as stations participating in multi-user transmission. Each of the first frame and the second frames may be a management frame, a control frame, or a data frame.

The STA1 may set the stations participating in multi-user transmission to at least one sub-group. The STA1 may set a sub-group ID corresponding to each sub-group for identifying respective sub-groups, and set respective IDs for stations included in the respective sub-groups. For example, the STA1 may set a sub-group 1 including the STA2 to STA5, and set its sub-group ID to '00.' Also, for the sub-group 1, the STA1 may set an ID of the STA2 to '00,' an ID of the STA3 to '01,' an ID of the STA4 to '10,' and an ID of the STA5 to 'H.' Alternatively, each of the IDs of the STA2 to STA5 may be set to AID or PAID.

Also, the STA1 may set a sub-group 2 including the STA6 to STA9, and set its sub-group ID to '01'. Also, for the sub-group 2, the STA1 may set an ID of the STA6 to '00,' an ID of the STAT to '01' an ID of the STA8 to '10,' and an ID of the STA9 to '11.' Alternatively, each of the IDs of the STA6 to STA9 may be set to AID or PAID. The STA1 may set at least one group including a plurality of sub-groups, and set a group ID for identifying respective groups. For example, the STA1 may set a group 1 including the sub-group 1 and the sub-group 2, and set an ID of the group 1 to '00.' Here, each of '00,' '01,' '10,' and '11' may be a binary number. According to the above-described manner, the relation among the group ID, the sub-group ID, and the station ID may be set as represented in the below table 1.

TABLE 1

| Group ID | | Sub-group ID | | Station ID | |
|---|---|---|---|---|---|
| Group 1 | 00 | Sub-group 1 | 00 | STA2 | 00 |
| | | | | STA3 | 01 |

TABLE 1-continued

| Group ID | Sub-group ID | | Station ID | |
|---|---|---|---|---|
| | | | STA4 | 10 |
| | | | STA5 | 11 |
| | Sub-group 2 | 01 | STA6 | 00 |
| | | | STA7 | 01 |
| | | | STA8 | 10 |
| | | | STA9 | 11 |

According to the table 1, in a case that 'group ID—sub-group ID—station ID' is used for multi-user transmission, the STA2 may be identified as '00 00 00,' and the STA7 may be identified as '00 01 01.' Alternatively, in a case that 'sub-group ID—station ID' is used for multi-user transmission, the STA2 may be identified as '00 00,' and the STA7 may be identified as '01 01.' The set manner of 'group ID—sub-group ID-station ID' is not restricted to the above-described manner. For example, the set manner of 'group ID—sub-group ID—station ID' may vary according to various exemplary embodiments.

Alternatively, instead of the above-described manner (e.g., group—sub-group), the STA1 may set stations participating in multi-user transmission to at least one group. As represented in the below table 2, the STA2 to STA9 may be identified by using 'group ID—station ID.'

TABLE 2

| Group ID | | Station ID | |
|---|---|---|---|
| Group 1 | 00 | STA2 | 00 |
| | | STA3 | 01 |
| | | STA4 | 10 |
| | | STA5 | 11 |
| Group 2 | 01 | STA6 | 00 |
| | | STA7 | 01 |
| | | STA8 | 10 |
| | | STA9 | 11 |

The STA1 may generate a Physical Layer Convergence Procedure (PLCP) protocol data unit (PPDU) to be transmitted according to multi-user transmission manner (S610). Here, the PPDU may be constructed as described below.

Figure 7:
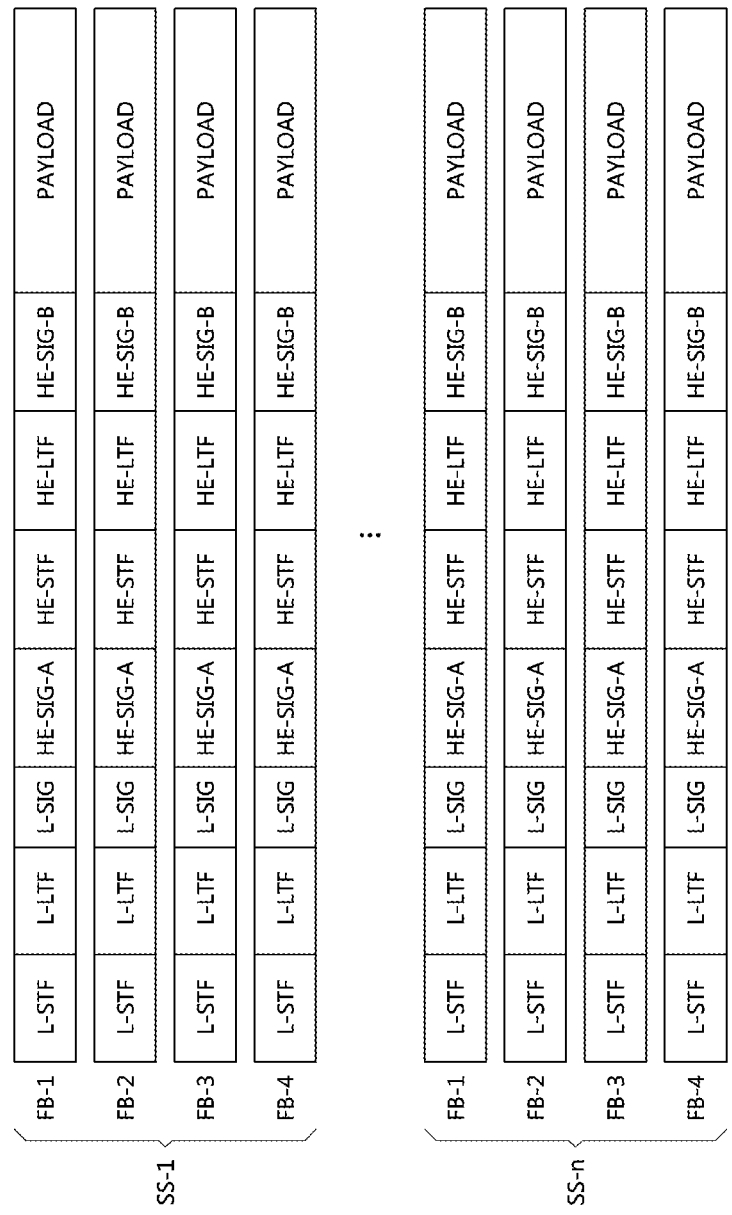
FIG. 7 is a block diagram illustrating an exemplary embodiment of PPDU.

FIG. 7 is a block diagram illustrating an exemplary embodiment of PPDU.

Referring to FIG. 7, when multi-user transmission is performed based on MU-MIMO, the STA1 may generate the PPDU transmitted through spatial streams SS-1, SS-2, . . . , SS-n. Here, n is a natural number larger than 3. The PPDU may be transmitted through frequency bandwidth 20 MHz, 40 MHz, 80 MHz, 160 MHz, 320 MHz, etc. In the PPDU, fields subsequent to a HE-signal A (HE-SIG-A) field may be transmitted through frequency bandwidth smaller than 20 MHz (e.g., 2.5 MHz, 5 MHz, 10 MHz, etc.) Each of the frequency bands FB-1, FB-2, FB-3, and FB-4 may have a frequency bandwidth 20 MHz. Also, in the frequency bands, subcarrier spacing may be 312.5 kHz, 156.25 kHz, or 78.125 kHz. In the present disclosure, the PPDU transmitted through frequency bandwidth 80 HMz will be described.

The PPDU may include a legacy preamble, a High Efficiency (HE) preamble, and a payload. The legacy preamble may include a Legacy-Short Training Field (L-STF), a Legacy-Long Training Field (L-LTF), and a Legacy-Signal (L-SIG) field. The HE preamble may include the HE-SIG-A field, a HE-STF field, at least one HE-LTF, and HE-SIG-B field. The HE-SIG-A field may include a HE-SIG-A1 field, a HE-SIG-A2 field, etc. The HE-SIG-A field may be duplicated in unit of 20 MHz. The number of HE-LTFs included in the HE preamble may be determined according to the number of spatial streams through which the PPDU is transmitted. For example, when the PPDU is transmitted through a single spatial stream in frequency bandwidth 20 MHz, a single HE-LTF may be included in the HE preamble. Meanwhile, when the number of spatial streams through which the PPDU is transmitted is 4, 4 HE-LTFs may be included in the HE preamble. The HE-SIG-B field may include a HE-SIG-B1 field, a HE-SIG-B2 field, etc. The structure of the HE preamble is not restricted to the above-described example. That is, the HE preamble may have various structures.

The HE-SIG fields (e.g., the HE-SIG-A field, the HE-SIG-B field, etc.) may include a first identifier. The first identifier may indicate which transmission manner is used for transmitting the PPDU including the HE-SIG fields (or, the payload included in the PPDU). For example, the first identifier may be set as represented in the below table 3.

TABLE 3

| First Identifier | Transmission Manner |
|---|---|
| 00 | Non-MU-MIMO (SU-MIMO), non-OFDMA (OFDM) |
| 01 | MU-MIMO |
| 10 | OFDMA |
| 11 | MU-MIMO, OFDMA |

According to the table 3, when the first identifier is set to '00,' it may indicate that the PPDU is transmitted in based on OFDM (e.g., a transmission manner except multi-user transmission manners such as MU-MIMO and OFDMA). When the first identifier is set to '01,' it may indicate that the PPDU is transmitted based on MU-MIMO. When the first identifier is set to '10' it may indicate that the PPDU is transmitted based on OFDMA. Also, when the first identifier is set to '11' it may indicate that the PPDU is transmitted based on MU-MIMO/OFDMA. Here, each of '00,' '01,' '10,' and '11' may be a binary number. The set manner of the first identifier is not restricted to the above-described example. That is, the first identifier may be set in various manners. For example, when the first identifier is set to binary number '0,' it may indicate that the PPDU is transmitted based on non-OFDMA. When the first identifier is set to binary number '1,' it may indicate that the PPDU is transmitted based on OFDMA. Alternatively, in a case that there is scheduling information for multi-user transmission which will be described below in the HE preamble, the scheduling information may indicate that the PPDU is transmitted according to a transmission manner corresponding to the scheduling information. On the contrary, when the scheduling information do not exist in the HE preamble, it may indicate that the PPDU is transmitted based on OFDM. Alternatively, the first identifier may indicate that the PPDU is transmitted based on single user-single input single output (SU-SISO) (or, SU-MIMO). According to the transmission manner indicated by the first identifier, the length of the HE-SIG-B field included in the HE preamble may vary. For example, in a case that the transmission manner of the PPDU indicated by the first identifier is SU-SISO or SU-MIMO, since scheduling information for reception stations is not necessary, the length of HE-SIG-B field of the HE preamble may be 0.

Meanwhile, the HE preamble may include scheduling information for multi-user transmission, and the scheduling information included in the HE preamble may vary according to the transmission manner of the PPDU. Alternatively, instead of including the scheduling information in the HE preamble, an additional frame including the scheduling information may be generated. In this case, the STA1 may transmit the frame including the scheduling information, and then transmit the PPDU based on the scheduling information. In the below description, the HE preamble used for PPDU transmissions based on MU-MIMO, OFDMA, and MU-MIMO/OFDMA will be described.

Figure 8:
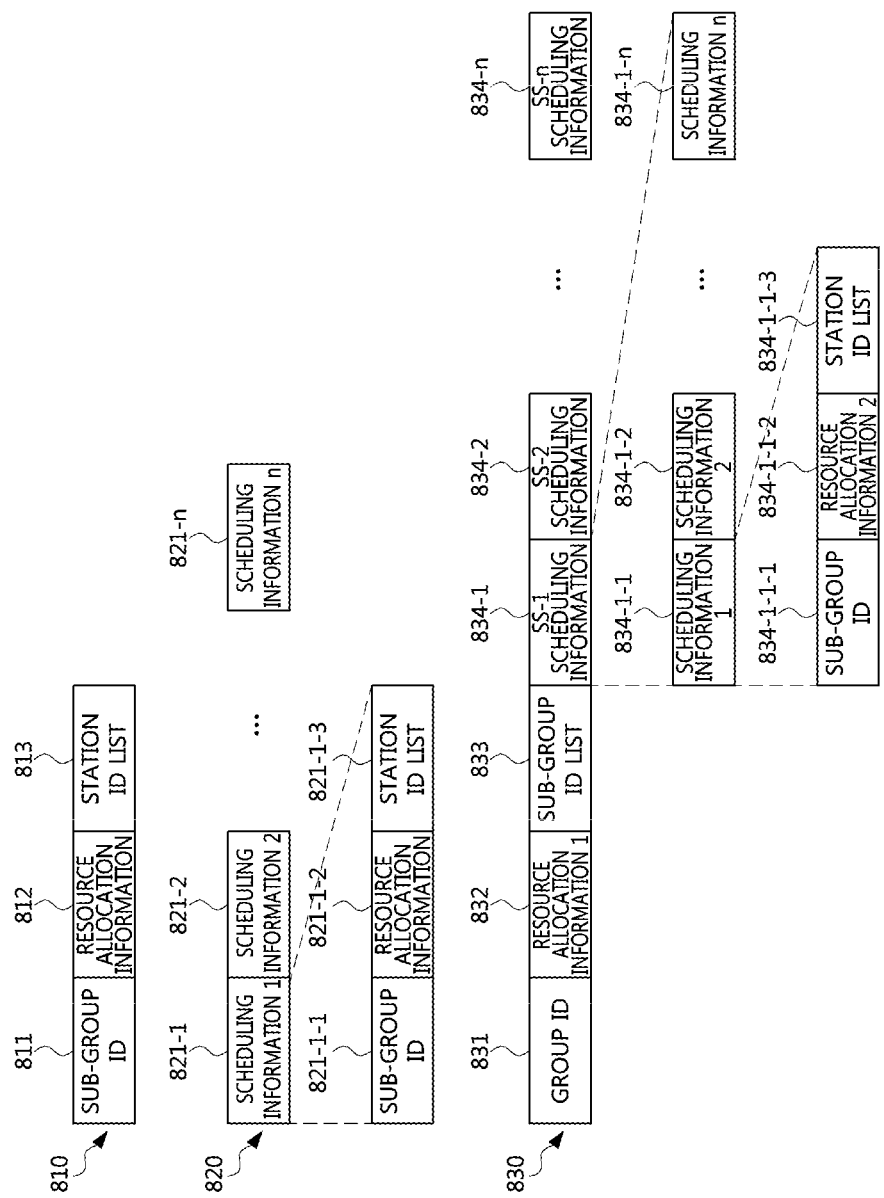
FIG. 8 is a block diagram illustrating scheduling information included in HE preamble.

FIG. 8 is a block diagram illustrating scheduling information included in HE preamble.

Referring to FIG. 8, the HE-SIG field 810 (e.g., the HE-SIG-A field, the HE-SIG-B field, etc.) of the HE preamble used for transmitting the PPDU based on MU-MIMO may include a sub-group ID field 811, a resource allocation information field 812, and a station ID list field 813. The sub-group ID field 811 may indicate a sub-group ID according to the above-described table 1. The resource allocation information field 812 may indicate an allocation pattern of at least one spatial stream. The size of the resource allocation information field 812 may vary according to the resource allocation pattern or the number of reception stations. In a case that the size of the resource allocation information field 812 varies, the HE preamble may include information indicating that the size of the resource allocation information field 812 varies and further include information indicating the size of the scheduling information (or, the size of the resource allocation information field 812). In this case, each of the information indicating the size of the resource allocation information field 812 varies and the information indicating the size of the scheduling information or the size of the resource allocation information field 812 may be positioned prior to the field including the scheduling information (or, the resource allocation information field 812) in the HE preamble.

Meanwhile, the scheduling information may be included in the HE-SIG-A field or the HE-SIG-B field among the HE-SIG fields of the HE preamble. Here, the HE-SIG-B field may include a common filed or a user-specific field. Among the scheduling information, common information for reception stations may be included in the common field of the HE-SIG-B field, and specific information for a specific reception station may be included in the user-specific field of the HE-SIG-B field. Alternatively, the scheduling information may be included in the HE-SIG-A field or the HE-SIG-B field of the HE preamble. For example, among the scheduling information, a part of common information for reception stations may be included in the HE-SIG-A field, and the rest of them may be included in the common field of the HE-SIG-B field. Also, the information used for a specific reception station may be included in the user-specific field of the HE-SIG-B filed.

FIG. 9 is a conceptual diagram illustrating an exemplary embodiment of an allocation pattern of spatial streams.

Referring to FIG. 9, in a case that the PPDU is transmitted through four spatial streams SS-1, SS-2, SS-3, and SS-4, when the resource allocation information is set to '00,' it may indicate that each of the spatial streams SS-1, SS-2, SS-3, and SS-4 is allocated for a different station. Also, when the resource allocation information is set to '01,' it may indicate that two spatial streams SS-1 and SS-2 are allocated for a station, the spatial stream SS-3 is allocated for another station, and the spatial stream SS-4 is allocated for the other station. Also, when the resource allocation information is set to '10,' it may indicate that the spatial streams SS-1 and SS-3 are allocated for a station, the spatial stream SS-2 is allocated for another station, and the spatial stream SS-4 is allocated for the other station. Also, when the resource allocation information is set to '11,' it may indicated that the spatial stream SS-1 is allocated for a station, the spatial streams SS-2 and SS-3 are allocated for another station, and the spatial stream SS-4 is allocated for the other station. Here, each of '00,' '01,' '10,' and '11' may be a binary number. The set manner of the resource allocation information and the allocation pattern of spatial streams are not restricted to the above-described example. That is, the resource allocation information and the allocation pattern of spatial streams may vary according to exemplary embodiments.

Re-referring to FIG. 8, the station ID list field 813 may include respective IDs of the stations participating in the PPDU transmission based on the MU-MIMO among stations included in the sub-group indicated by the sub-group ID. Here, the station ID may be a station ID described by referring to the table 1. For example, when the sub-group ID is set to '00', among the STA2 to STA5, the station ID list field 813 may include respective IDs (e.g., 00, 01, 10, and 11) of stations participating in the PPDU transmission based on the MU-MIMO.

According to the above description, in a case that the scheduling information 'sub-group ID field 811+resource allocation information field 812+station ID list field 813' is set to '00 00 10110100,' it may indicate that at least one data unit (e.g., MAC protocol data unit (MPDU) or aggregated-MPDU (A-MPDU)) for the STA4 is transmitted through the spatial stream SS-1, at least one data unit for the STA5 is transmitted through the spatial stream SS-2, at least one data unit for the STA3 is transmitted through the spatial stream SS-3, and at least one data unit for the STA2 is transmitted through the spatial stream SS-4. In other words, data units for respective stations indicated by the first, second, third, and fourth station IDs included in the station ID list field 813 may be transmitted through each of the spatial streams SS-1, SS-2, SS-3, and SS-4.

In a case that the scheduling information 'sub-group ID field 811+resource allocation information field 812+station ID list field 813' is set to '00 01 100100,' it may indicate that data units for the STA4 are transmitted through the spatial streams SS-1 and SS-2, at least one data unit for the STA3 is transmitted through the spatial stream SS-3, and at least one data unit for the STA2 is transmitted through the spatial stream SS-4. Here, since the data units for the STA4 are transmitted through two contiguous spatial streams SS-1 and SS-2, the ID of the STA4 may be included in the station ID list field 813 only once. That is, since the station allocated to the spatial stream SS-1 and the station allocated to the spatial stream SS-2 are identical, the first ID included in the station ID list field 813 may indicate not only the station allocated to the spatial stream SS-1 but also the station allocated to the spatial stream SS-2. Alternatively, in this case, the scheduling information 'sub-group ID field 811+resource allocation information field 812+station ID list field 813' may be set to '00 01 10100100.' That is, the ID of the STA4 may not be omitted in the station ID list field 813.

In a case that the scheduling information 'sub-group ID field 811+resource allocation information field 812+station ID list field 813' is set to '00 10 100100,' it may indicate that data units for the STA4 are transmitted through the spatial streams SS-1 and SS-3, at least one data unit for the STA3 is transmitted through the spatial stream SS-2, and at least one data unit for the STA2 is transmitted through the spatial stream SS-4. Here, since the data units for the STA4 are transmitted through two non-contiguous spatial streams SS-1 and SS-3, the ID of the STA4 may be included in the station ID list field 813 only once. That is, since the station allocated to the spatial stream SS-1 and the station allocated to the spatial stream SS-3 are identical, the first ID included in the station ID list field 813 may indicate not only the station allocated to the spatial stream SS-1 but also the station allocated to the spatial stream SS-3. Alternatively, in this case, the scheduling information 'sub-group ID field 811+resource allocation information field 812+station ID list field 813' may be set to '00 10 10011000.' That is, the ID of the STA4 may not be omitted in the station ID list field 813.

Alternatively, the HE-SIG field 810 (e.g., HE-SIG-A field, HE-SIG-B field, etc.) of the HE preamble used for transmitting PPDU based on MU-MIMO may include a sub-group ID field 811, a $N_{STS}$ field (not illustrated), and a station allocation information field (not illustrated). Also, the HE-SIG field 810 of the HE preamble may further include a Space-Time Block Coding (STBC) field. The sub-group ID field may indicate a sub-group ID described by referring to the table 1. The number of spatial streams allocated for stations indicated by the station allocation information field may be determined according to the values which are respectively indicated by the $N_{STS}$ field and the STBC field. For example, the number of spatial streams may be determined according to the below table 4.

TABLE 4

| $N_{STS} \times N_{SS}$ | Value indicated by STBC field |
|---|---|
| 2 × 1 | 1 |
| 3 × 2 | 1 |
| 4 × 2 | 2 |
| 4 × 3 | 1 |

Alternatively, the station allocation information field may be represented in a bitmap form. For example, each of the first, second, third, and fourth fields included in the station allocation information field may indicate whether a spatial stream is allocated for the STA2, STA3, STA4, and STA5 among stations belonging to the sub-group indicated by the sub-group ID field 811. When the station allocation information field is set to binary number '1001,' it may indicate that the number of spatial streams determined according to values indicated by the $N_{STS}$ field and the STBC field is allocated for the STA2 and STA5, and spatial streams are not allocated to the STA3 and STA4.

Meanwhile, the HE-SIG field 820 (e.g., HE-SIG-A field, HE-SIG-B field, etc.) of the HE preamble used for transmitting PPDU based on OFDMA may include at least one scheduling information 821-1, 821-2, . . . , 821-*n*. That is, in a case that the payload of the PPDU is constituted by a plurality of time domains, scheduling information for respective time domains may be included in the HE-SIG field 820. For example, in a case that the payload of the PPDU has a first time domain and a second time domain, the scheduling information 821-1 for the first time domain and the scheduling information 821-2 for the second time domain may be included in the HE-SIG field 820. The HE-SIG field 820 may include a sub-group ID field 821-1-1, a resource allocation information field 821-1-2, and a station ID list field 821-1-3 as the scheduling information. The sub-group ID field 821-1-1 may indicate a sub-group ID described by referring to the table 1. The resource allocation information field 821-1-2 may indicate an allocation pattern of frequency bands.

The size of the resource allocation information field 821-1-2 may vary according to resource allocation patterns or the number of reception stations. In a case that the size of the resource allocation information field 821-1-2 is variable, the HE preamble may include information indicating that the size of the resource allocation information field 821-1-2 is variable, and may further include information indicating the size of scheduling information (or, the size of the resource allocation information field 821-1-2). In this case, each of the information indicating that the size of the resource allocation information field 821-1-2 is variable and the information indicating that the size of the scheduling information (or, the size of the resource allocation information field 821-1-2) may be positioned prior to the field including the scheduling information (or, the resource allocation information field 821-1-2) in the HE preamble.

Meanwhile, the scheduling information may be included in the HE-SIG-A field or the HE-SIG-B field of the HE-SIG field in the HE preamble. Among the scheduling information, common information for reception stations may be included in the common field of the HE-SIG-B field, and specific information for a specific reception station may be included in the user-specific field of the HE-SIG-B field. Alternatively, the scheduling information may be included in the HE-SIG-A field and the HE-SIG-B field of the HE preamble. For example, among the scheduling information, a part of common information for reception stations may be included in the HE-SIG-A field, and the rest of them may be included in the common field of the HE-SIG-B field. Also, the information used for a specific reception station may be included in the user-specific field of the HE-SIG-B filed.

FIG. 10 is a conceptual diagram illustrating an exemplary embodiment of an allocation pattern of frequency bands.

Referring to FIG. 10, in a case that a PPDU is transmitted through four frequency bands FB-1, FB-2, FB-3, and FB-4, when the resource allocation information is set to '00,' it may indicate that the respective frequency bands FB-1, FB-2, FB-3, and FB-4 are allocated for different stations. Also, when the resource allocation information is set to '01,' it may indicate that two frequency bands FB-1 and FB-2 are allocated for a station, the frequency band FB-3 is allocated for another station, and the frequency band FB-4 is allocated for the other station. When the resource allocation information is set to '10' or '11,' it may indicate the allocation pattern of frequency bands in the same manner. Here, each of '00', '01', '10,' and '11' may be a binary number.

In a case that a PPDU is transmitted through a frequency bandwidth equal to or larger than 40 MHz, the allocation pattern of frequency bands may be differently set in unit of predetermined bandwidth (e.g., 20 MHz), and frequency resources within the predetermined bandwidth may be allocated to at least one reception station. For example, when a PPDU is transmitted through a frequency band including contiguous first, second, . . . , nth sub-frequency bands in unit of 20 MHz, each of odd-numbered sub-frequency bands (e.g., first sub-frequency band, third sub-frequency band, etc.) may be allocated according to a first allocation pattern, and each of even-numbered sub-frequency bands (e.g., second sub-frequency band, fourth sub-frequency band, etc.) may be allocated according to a second allocation pattern. Here, n is a natural number larger than 3.

The set manners of the resource allocation information and the allocation patterns of frequency bands indicated by the resource allocation manner are not restricted to the above-described example, and they may vary according to exemplary embodiments.

Re-referring to FIG. 8, the station ID list field 821-1-3 may include IDs of respective stations participating in the PPDU transmission based on OFDMA among stations included in the sub-group indicated by the sub-group ID. Here, the station IDs may be station IDs described by referring to the table 1. For example, when the sub-group ID is set to '00,' the station ID list field 821-1-3 may include IDs of the stations participating in the PPDU transmission based on OFDMA (e.g., '00', '01,' '10,' and '11') among the STA2 to STA5.

According to the above description, in a case that the scheduling information 'sub-group ID field 821-1-1+resource allocation information field 821-1-2+station ID list field 821-1-3' is set to '00 00 10110100,' it may indicate that data units for each of the stations STA4, STA5, STA3, and STA2 are respectively transmitted through each of the frequency bands FB-1, FB-2, FB-3, and FB-4, similarly to the above-described case of the HE-SIG field 810. Also, in a case that the scheduling information 'sub-group ID field 821-1-1+resource allocation information field 821-1-2+station ID list field 821-1-3' is set to '00 01 100100' (i.e., when data units for a single station are transmitted through two frequency bands FB-1 and FB-2), it may indicate that data units for the STA3 are transmitted through the frequency bands FB-1 and FB-2, and data units of each of the STA3 and STA2 are respectively transmitted through each of the frequency bands FB-3 and FB-4. Also, in a case that the scheduling information 'sub-group ID field 821-1-1+resource allocation information field 821-1-2+station ID list field 821-1-3' is set to '00 10 100100' (i.e., when data units for a single station are transmitted through non-contiguous frequency bands FB-1 and FB-3), it may indicate that data units for the STA4 are transmitted through frequency bands FB-1 and FB-3, and data units for each of the STA3 and STA2 are transmitted through each of the frequency bands FB-2 and FB-4, similarly to the case of the HE-SIG field 810.

Meanwhile, in the transmission based on OFDMA, data for different stations may be multiplexed and transmitted in time domain.

FIG. 11 is a block diagram illustrating an exemplary embodiment of a payload included in a PPDU.

Referring to FIG. 11, the PPDU payload may include a first time domain and a second time domain. The length of the first time domain may be identical to or different from the length of the second time domain. The lengths of data units for respective frequency bands FB-1, FB-2, FB-3, and FB-4 may be different in each of the time domains. In the first time domain, a frequency band allocation pattern may be indicated by the resource allocation information '00' described by referring to FIG. 10. Also, in the second time domain, a frequency band allocation pattern may be indicated by the resource allocation information '01' described by referring to FIG. 10. The HE-SIG field 820 may include a first scheduling information field 821-1 including scheduling information for the first time domain, and a second scheduling information field 821-2 including scheduling information for the second time domain. The first scheduling information field 821-1 may be set to '00 00 10110100' and the second scheduling information field 821-2 may be set to '00 01 100100.'

Re-referring to FIG. 8, the HE-SIG field 830 (e.g., HE-SIG-A field, HE-SIG-B field, etc.) of the HE preamble used for the PPDU transmission based on MU-MIMO/OFDMA may include a group ID field 831, a first resource allocation information field 832, a sub-group ID list field 833, and at least one SS scheduling information field 834-1, 834-2, ..., 834-*n*, as scheduling information. Alternatively, the scheduling information may be included in the HE-SIG-A field or the HE-SIG-B field in the HE-SIG field of the HE preamble. Among the scheduling information, common information for reception stations may be included in a common field of the HE-SIG-B field, and information for a specific reception station may be included in a user-specific field of the HE-SIG-B filed. Alternatively, the scheduling information may be included in the HE-SIG-A field and the HE-SIG-B field in the HE-SIG field of the HE preamble. For example, among the scheduling information, a part of common information for reception stations may be included in the HE-SIG-A field, and the rest of them may be included in the common field of the HE-SIG-B field. Also, the information used for a specific reception station may be included in the user-specific field of the HE-SIG-B filed.

The group ID field 831 may indicate a group ID described by referring to the table 1. The first resource allocation information field 832 may indicate a resource allocation pattern of spatial streams identically to the above-described resource allocation information field 812 of the HE-SIG field 810. The size of the first resource allocation information field 832 may vary according to the resource allocation pattern or the number of reception stations. In a case that the size of the first resource allocation information field 832 is variable, the HE preamble may include information indicating that the size of the first resource allocation field 832 is variable and may further information indicating the size of the scheduling information (or, the size of the first resource allocation information field 832). In this case, each of the information indicating that the size of the first resource allocation information field 832 is variable and the information indicating the size of the scheduling information (or, the size of the first resource allocation information field 832) may be positioned prior to the field including the scheduling information (or, the first resource allocation information field 832) in the HE preamble.

The sub-group ID list field 833 may include respective IDs of the sub-groups participating in the PPDU transmission based on MU-MIMO among sub-groups included in the group indicated by the group ID. Here, the sub-group ID may be a sub-group ID described by referring to the table 1.

Each of the SS scheduling information fields 834-1, 834-2, ..., 834-*n* may indicate scheduling information of each PPDU transmitted through the corresponding spatial stream. For example, a SS-1 scheduling information field 834-1 may indicate scheduling information of a PPDU transmitted through the spatial stream SS-1. The number of the SS scheduling information fields 834-1, 834-2, ..., 834-*n* may correspond to the number of spatial streams through which PPDUs are transmitted. For example, when PPDUs are transmitted through four spatial streams, the HE-SIG field 830 may include four SS scheduling information fields 834-1, 834-2, 834-3, and 834-4.

Each of the SS scheduling fields 834-1, 834-2, ..., 834-*n* may include at least one scheduling information fields (e.g., 834-1-1, 834-1-2, ..., 834-1-*n*). That is, when the PPDU payload includes multiple time domains, scheduling information for each of the multiple time domains may be included in the SS scheduling information fields 834-1, 834-2, ..., 834-*n*. For example, when the PPDU payload includes the first time domain and the second time domain, scheduling information 834-1-1 for the first time domain and scheduling information 834-1-2 for the second time domain may be included in the SS-1 scheduling information field 834-1.

The first scheduling information field 834-1-1 may include a sub-group ID field 834-1-1-1, a second resource allocation information field 834-1-1-2, and a station ID list field 834-1-1-3. The sub-group ID field 834-1-1-1 may indicate a sub-group ID described by referring to the table 1. The second resource allocation information field 834-1-1-2 may indicate an allocation pattern of frequency bands, identically to the above-described resource allocation information field 821-1-2 of the HE-SIG field 820. The size of the second resource allocation information field 834-1-1-2 may vary according to the resource allocation pattern or the number of reception stations. In a case that the size of the second resource allocation information field 834-1-1-2 is variable, the HE preamble may include information indicating that the size of the second resource allocation information field 834-1-1-2 is variable and may further information indicating the size of the scheduling information (or, the size of the second resource allocation information field 834-1-1-2). In this case, each of the information indicating that the size of the second resource allocation information field 834-1-1-2 is variable and the information indicating the size of the scheduling information (or, the size of the second resource allocation information field 834-1-1-2) may be positioned prior to the field including the scheduling information (or, the second resource allocation information field 834-1-1-2) in the HE preamble.

The station ID list field 834-1-1-3 may include respective IDs of the stations participating in the PPDU transmission based on the OFDMA among stations included in the sub-group indicated by the sub-group ID. Here, the station ID may be a station ID described by referring to the table 1. That is, 'sub-group ID field 834-1-1-1+second resource allocation information field 834-1-1-2+station ID list field 834-1-1-3' may act the same role as that of 'sub-group ID list field 821-1-1+resource allocation information field 821-1-2+station ID list field 821-1-3' included in the above-described HE-SIG field 820.

Re-referring to FIG. 7, the HE-SIG-B field may include information needed for reception of the corresponding payload. The HE-SIG-B field may include different information for each of the frequency bands FB-1, FB-2, FB-3, and FB-4. Also, the HE-SIG-B field may include a second indicator on whether the corresponding payload includes multiple time domains (or, whether data for different stations are multiplexed and transmitted in time domain). For example, when the second indicator is set to '0,' it may indicate that the corresponding payload includes a single time domain, and when the second indicator is set to '1,' it may indicate that the corresponding payload includes multiple time domains (e.g., time domains illustrated in FIG. 11).

Also, the HE-SIG-B field may include a third indicator on whether the corresponding payload includes data units belonging to different access categories (e.g. AC_VO, AC_VI, AC_BE, and AC_BK). For example, when the third indicator is set to '0,' it may indicate that the corresponding payload includes at least one data unit belonging to a single access category (AC), and when the third indicator is set to '1,' it may indicate that the corresponding payload includes data units belonging to different access categories. Here, the HE-SIG-B field may further include a traffic ID (TID) list field. The TID list field may include TIDs for access categories to which each of data units included in the payload belongs.

Also, the HE-SIG-B field may further include a fourth indicator on whether the corresponding payload includes data units having different frame formats (e.g., control frame, management frame, and data frame). For example, when the fourth indicator is set to '0,' it may indicate that the payload includes data units belonging to a single frame format, and when the fourth indicator is set to '1,' it may indicate that the payload includes data units belonging to different frame formats. Here, the HE-SIG-B field may further include a frame format ID list field. The frame format ID list field may include frame format IDs for respective data units included in the payload. For example, in a case that frame format IDs '00,' '01,' and '10' respectively indicate a control frame, a management frame, and a data frame, when the frame format ID is set to '0010,' it may indicate that the payload includes a data unit having a control frame format and a data unit having a data frame format.

The payload including data units belonging to different access categories or data units having different MAC frame formats may have the following structure.

Figure 12:
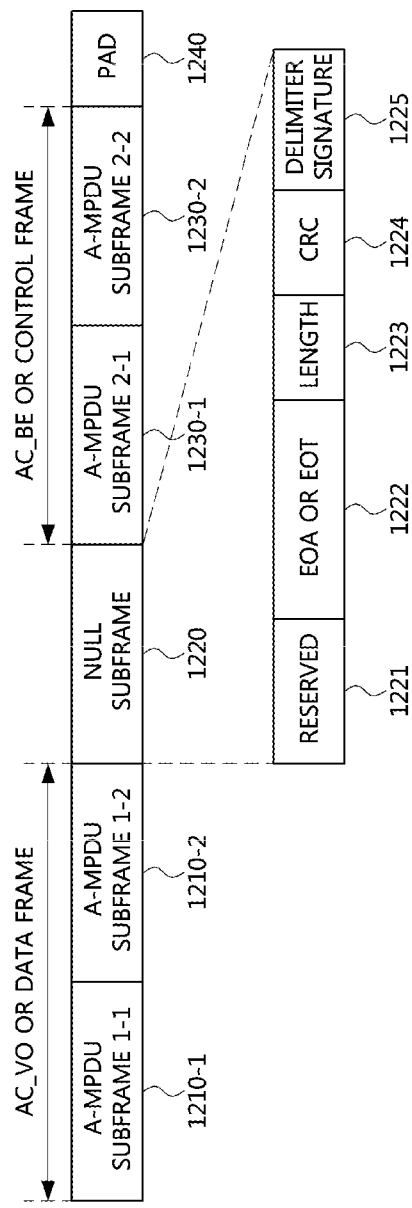
FIG. 12 is a block diagram illustrating another exemplary embodiment of a payload included in a PPDU.

FIG. 12 is a block diagram illustrating another exemplary embodiment of a payload included in a PPDU.

Referring to FIG. 12, the payload may include A-MPDUs belonging to different access categories or A-MPDUs having different MAC frame formats. For example, the payload may include A-MPDU subframes 1210-1 and 1210-2 belonging to AC_VO (or, having a data frame format), a Null subframe 1220, A-MPDU subframes 1230-1 and 1230-2 belonging to AC_BE (or, having a control frame format), and a pad field 1240. The Null subframe 1220 may be located between A-MPDUs belonging to different access categories (or, between A-MPDUs having different frame formats). At least one Null subframe 1220 may be included in the payload, and each of the multiple Null subframes may have the same information.

The Null subframe 1220 may include a reserved field 1221, an End-of-AC (EOA) field (or, End-of-Type (EOT) field) 1222, a length field 1223, a cyclic redundancy check (CRC) field 1224, and a delimiter signature field 1225. The EOA field 1222 may indicate that an AC to which the A-MPDU subframes 1230-1 and 1230-2 subsequent to the Null subframe 1220 belong is different from an AC to which the A-MPUD subframes 1210-1 and 1210-2 prior to the Null subframe 1220 belong. That is, the EOA field 1222 may indicate an end of A-MPDU subframes 1210-1 and 1210-2 belonging to AC_VO. Alternatively, the EOT field 1222 may indicate that a frame format of the A-MPDU subframes 1230-1 and 1230-2 subsequent to the Null subframe 1220 is different from a frame format of the A-MPUD subframes 1210-1 and 1210-2 prior to the Null subframe 1220. That is, the EOT field 1222 may indicate an end of A-MPDU subframes 1210-1 and 1210-2 having a data frame format. The length field 1223 may indicate the length of a MPDU included in the Null subframe 1220, and may be set to '0.'

Re-referring to FIG. 7, the HE-SIG-B field may include modulation and coding scheme (MCS) index information and length information for the corresponding payload. The length information may indicate a length from an end point (or, a start point of the payload) of the HE-SIG-B field to an end point of a data unit included in the payload (e.g., a start point of the pad field). When the payload include a plurality of time domains, the HE-SIG-B field may include MSC index information and length information for each of the plurality of time domains. For example, in the case of the PPDU payload illustrated in FIG. 11, the HE-SIG-B field may include a HE-SIG-B1 field for the first time domain and a HE-SIG-B2 field for the second time domain. The HE-SIG-B1 field may include MCS index information and length information for the first time domain. Here, the length information may indicate a length from a start point of the payload (or, an end point of the HE-SIG-B1 field) to an end point of the data unit belonging to the first time domain. The HE-SIG-B2 field may include MCS index information and length information for the second time domain. Here, the length information may indicate a length from a start point of the second time domain to an end point of the data unit belonging to the second time domain.

Also, in a case that the payload includes data units belonging to different access categories (or, data units having different MAC frame formats), the HE-SIG-B field may include MCS index information and length information for each of the multiple data units. Here, the length information may be included in a header of the payload. For example, in the payload of the PPDU illustrated in FIG. 12, the HE-SIG-B field may include a HE-SIG-B1 field for A-MPDU subframes 1210-1 and 1210-2 belonging to AC_VO (or, A-MPDU subframes having a data frame format) and a HE-SIG_B2 field for A-MPDU subframes 1230-1 and 1230-2 belonging to AC_BE (or, A-MPDU subframes having a control frame format). The HE-SIG-B1 field may include MCS index information and length information of the A-MPDU subframes 1210-1 and 1210-2. Here, the length information may indicate a length from a start point of the payload (or, an end point of the HE-SIG-B1 field) to an end point of the A-MPDU subframe 1210-2 (e.g., a start point of the Null subframe 1220). The HE-SIG-B2 field may include MCS index information and length information for the A-MPDU subframe 1230-1 and 1230-2. Here, the length information may indicate a length from a start point of the A-MPDU subframe 1230-1 (e.g., an end point of the Null subframe 1220) to an end point of the A-MPDU subframe 1230-2.

Re-referring to FIG. 6, the STA1 may transmit the PPDU generated in the above-described manner based on multi-user transmission (S602). In a case that the PPDU is transmitted based on MU-MIMO, the STA1 may transmit the PPDU to one of the STA2 to STA5 through the spatial stream SS-1, and transmit the PPDU to one of the STAG to STA9 through the spatial stream SS-2. In a case that the PPDU is transmitted based on OFDMA, the STA1 may transmit the PPDU to the STA2 to STA9. In a case that the PPDU is transmitted based on MU-MIMO/OFDMA, the STA1 may transmit the PPDU to the STA2 to STA9 in the OFDMA through the spatial stream SS-1, and transmit the PPDU to the STA2 to STA9 in the OFDMA through the spatial stream SS-2.

Meanwhile, upon receiving the PPDU, reception stations (e.g., the STA2 to STA9) may obtain the legacy preamble and the HE preamble of the PPDU, and obtain the first indicator included in the HE-SIG-A field of the HE preamble. Since the first indicator indicates a transmission manner described in the table 2, the reception stations may identify a transmission manner of the corresponding PPDU by using the first indicator. Since scheduling information is varied according to the transmission manner of the PPDU, the reception stations predict which scheduling information is transmitted. For example, when the reception station identifies that the PPDU is transmitted based on MU-MIMO, the reception station may predict that the 'sub-group ID field 811+resource allocation information field 812+station ID list field 813' illustrated in FIG. 8 is transmitted as scheduling information, and the reception station may identify a resource (e.g., spatial stream) through which its data can be received. The reception station may obtain information needed for receiving a data unit (e.g., MCS index information, length information, etc.) by receiving the HE-SIG-B field related to the identified resource, and receive and decode the data unit based on the obtained information.

Also, when the reception station identifies that the PPDU is transmitted based on OFDMA, the reception station may predict that the 'at least one scheduling information field 821-1, 821-2, . . . , 821-n' illustrated in FIG. 8 is transmitted as scheduling information, and the reception station may identify a resource (e.g., frequency and time) through which its data can be received by receiving the scheduling information. The reception station may obtain information needed for receiving a data unit (e.g., MCS index information, length information, etc.) by receiving the HE-SIG-B field related to the identified resource, and receive and decode the data unit based on the obtained information.

Also, when the reception station identifies that the PPDU is transmitted based on MU-MIMO/OFDMA, the reception station may predict that the 'group ID field 831+first resource allocation information field 832+sub-group ID list field 833+at least one SS scheduling information field 834-1, 834-2, . . . , 834-n' illustrated in FIG. 8 is transmitted as scheduling information, and the reception station may identify a resource (e.g., spatial stream, time, frequency) through which its data can be received. The reception station may obtain information needed for receiving a data unit (e.g., MCS index information, length information, etc.) by receiving the HE-SIG-B field related to the identified resource, and receive and decode the data unit based on the obtained information.

For example, when the first scheduling information field 821-1 and the second scheduling information field 821-2 are respectively set to '00 00 10110100' and '00 01 100100,' the STA4 may receive and decode at least one data unit transmitted through the first frequency band FB-1 in the first time domain, and receive and decode data units transmitted through the frequency bands FB-1 and FB-2 in the second time domain. Meanwhile, the STA4 may receive a pilot signal transmitted through the frequency band FB-2 in the first time domain, and decode the data unit based on the pilot signal. That is, when the length of the data unit received in the first time domain is longer than a predetermined length, error of channel estimation based on the HE-STF, the HE-LTF, and so on may be increased. In this case, the STA4 can perform channel estimation (e.g., phase-tracking) by receiving the pilot signal transmitted through the first frequency band FB-1 in the first time domain before it receives the data transmitted through the second frequency band FB-2 in the second time domain.

When the reception station successfully receives the data, in response to the data, the reception station may transmit a response frame (e.g. an acknowledgement (ACK) frame) to the STA1 (S603, S604). The response frame may be transmitted in various manners. For example, according to the above-described FIG. 11, when the first scheduling information field 821-1 and the second scheduling information field 821-2 are respectively set to '00 00 10110100' and '00 01 100100,' each of the STA4, STA5, STA3, and STA2 may transmit a response frame to the STA1 in a third time domain (not illustrated), as a response corresponding to the data unit received in the first time domain. In this case, each of the STA4, STA5, STA3, and STA2 may transmit the response frame to the STA1 in one or more manners including OFDMA, code division multiple access (CDMA), sequential transmission manner, etc. Here, when the sequential transmission manner is used, the STA4, STA5, STA3, and STA2 may sequentially transmit their response frames to the STA1 in the third time domain. The interval between the response frames transmitted by the STA4, STA5, STA3, and STA2 may be a SIFS. The third time domain may be a time domain after a SIFS from an end of the PPDU transmitted from the STA1, or may be indicated by the STA1. For example, the STA1 may indicate information on a resource allocated for the third time domain by transmitting a first request frame after the PPDU transmission, and request a transmission of the response frame in the third time domain as the response of the data unit. The first request frame may be a frame performing function of a block ACK request (BAR) frame, a beamforming poll frame, etc.

Also, each of the STA4, STA3, and STA2 may transmit a response frame for the data unit received in the second time domain to the STA1 in a fourth time domain (not illustrated). Identically to the above-described transmission manner of the response frame in the third time domain, the STA4, STA3, and STA2 may transmit the response frames to the STA1. Here, the fourth time domain may be indicated by the above-described first request frame, or indicated by a second request frame transmitted by the STA1 after the third time domain.

Also, the response frames for the data units transmitted in the first time domain and the second time domain may be aggregated into a single response frame, and the single response frame is transmitted. For example, the response frames for the data units transmitted to the STA4 through the first frequency band FB-1 in the first time domain and the second time domain may be aggregated into a single response frame, and the single response frame may be transmitted to the STA1 in the third time domain. Also, the response frames for the data units transmitted respectively to the STA3 and STA4 through the second frequency band FB-2 in the first time domain and the second time domain may be aggregated into a single response frame, and the single response frame may be transmitted to the STA1 in the third time domain. Also, the response frames for the data units transmitted through the frequency bands FB-3 and FB-4 may be transmitted to the STA1 in the third time domain in the manner identical to the above-described manner.

Meanwhile, when the STA1 receives the response frames respectively from the STA2 to STA9, the STA1 may determine that the data is successfully received at the corresponding station.

While the example embodiments of the present disclosure and their advantages have been described in detail, it should be understood that various changes, substitutions and alterations may be made herein without departing from the scope of the disclosure.

What is claimed is:

1. An operation method performed in a first station, the method comprising:
   generating a high efficiency (HE) preamble including first scheduling information of a first plurality of reception stations and second scheduling information of a second plurality of reception stations different from the first plurality of reception stations;
   generating a physical layer protocol data unit (PPDU) including a legacy preamble, the HE preamble, and a payload, the payload being after the HE preamble and including a plurality of time domains, the plurality of time domains including a first time domain having a first plurality of data units to be transmitted to the first plurality of reception stations and a second time domain having a second plurality of data units to be transmitted to the second plurality of reception stations; and
   transmitting the PPDU using one or more frequency bands, wherein the first scheduling information includes 1) first resource allocation information indicating a resource in the first time domain allocated to the first plurality of reception stations, and 2) a first station identifier list including identification information for each of the first plurality of reception stations,
   wherein the second scheduling information includes 1) second resource allocation information indicating a resource in the second time domain allocated to the second plurality of reception stations, and 2) a second station identifier list including identification information for each of the second plurality of reception stations, and
   wherein the first resource allocation information includes a first allocation pattern of the one or more frequency bands, and the second resource allocation information includes a second allocation pattern of the one or more frequency bands.

2. The operation method according to claim 1, wherein the HE preamble further includes information indicating a transmission manner of the PPDU.

3. The operation method according to claim 1, wherein the PPDU is transmitted based on at least one of a multi user-multiple input multiple output (MU-MIMO) and an orthogonal frequency division multiple access (OFDMA).

4. The operation method according to claim 1, wherein the first scheduling information is included in a HE signal (HE-SIG) field of the HE preamble.

5. The operation method according to claim 1, wherein the first scheduling information further includes identification information of a sub-group to which the first plurality of reception stations belong.

6. The operation method according to claim 1, wherein the HE preamble further includes scheduling information of a plurality of groups to which the first plurality of reception stations respectively belong.

7. The operation method according to claim 6, wherein the scheduling information of the plurality of groups includes resource allocation information indicating a resource allocated to the plurality of groups and identification information for each of the plurality of groups.

8. The operation method according to claim 1, wherein the HE preamble further includes information indicating that the payload is divided into the plurality of time domains.

9. The operation method according to claim 1, wherein the HE preamble further includes information indicating lengths of data units included in each of the plurality of time domains.

10. The operation method according to claim 1, wherein, when the PPDU includes data units belonging to different access categories, the HE preamble further includes information indicating that the PPDU includes data units belonging to different access categories.

11. The operation method according to claim 1, wherein, when the PPDU includes data units belonging to different access categories, the HE preamble further includes traffic identifiers (TIDs) for access categories to which the data units belonging to different access categories respectively belong.

12. The operation method according to claim 1, wherein the PPDU includes data units belonging to different access categories and information indicating an end of data units belonging to a first access category, and the information indicating the end of data units is located between the data units belonging to the different access categories.

13. An operation method performed by a first station, the method comprising:

receiving, using one or more frequency bands, a physical layer protocol data unit (PPDU) including a payload, the payload being after a High Efficiency (HE) preamble of the PPDU and divided into a plurality of time domains, the plurality of time domains including a first time domain having a first plurality of data units intended for the first plurality of reception stations and a second time domain having a second plurality of data units intended for a second plurality of reception stations different from the first plurality of reception stations;

obtaining a legacy preamble of the PPDU;

obtaining the HE preamble of the PPDU, the HE preamble including first scheduling information for the first time domain and second scheduling information for the second time domain; and obtaining at least one data unit of the first plurality of data units included in the first time domain of the payload of the PPDU through a resource of the first time domain indicated by the first scheduling information for the first plurality of reception stations, wherein the first scheduling information includes 1) first resource allocation information indicating the resource of the first time domain is allocated to the first station, and 1) a first station identifier list including identification information for each of the first plurality of reception stations, wherein the second scheduling information includes 1) second resource allocation information indicating a resource of the second time domain is allocated to a second station, and 1) a second station identifier list including identification information for each of the second plurality of reception stations, and wherein the first resource allocation information includes a first allocation pattern of the one or more frequency bands, and the second resource allocation information includes a second allocation pattern of the one or more frequency bands.

14. The operation method according to claim 13, wherein the HE preamble further includes information indicating a transmission manner of the PPDU.

15. The operation method according to claim 13, wherein the first scheduling information further includes identification information of a sub-group to which the first plurality of reception stations belong.

16. The operation method according to claim 13, wherein the HE preamble further includes information indicating lengths of data units included in each of the plurality of time domains.

17. The operation method according to claim 13, wherein the one or more frequency bands includes a plurality of frequency bands.

18. The operation method according to claim 1, wherein the one or more frequency bands includes a plurality of frequency bands.

19. The operation method according to claim 13, wherein the first station identifier list includes a first plurality of station identifiers, the second station identifier list includes a second plurality of station identifiers, or both.

20. The operation method according to claim 1, wherein the first station identifier list includes a first plurality of station identifiers, the second station identifier list includes a second plurality of station identifiers, or both.

* * * * *